US010308439B2

(12) United States Patent
McCally et al.

(10) Patent No.: US 10,308,439 B2
(45) Date of Patent: Jun. 4, 2019

(54) CHAIN MONITORING SYSTEM

(71) Applicant: Stewart Systems Baking, LLC, Plano, TX (US)

(72) Inventors: Scott C. McCally, Plano, TX (US); Jay K. Smith, Plano, TX (US)

(73) Assignee: Stewart Systems Baking, LLC, Plano, TX (US)

( * ) Notice: Subject to any disclaimer, the term of this patent is extended or adjusted under 35 U.S.C. 154(b) by 0 days.

(21) Appl. No.: 15/726,073

(22) Filed: Oct. 5, 2017

(65) Prior Publication Data

US 2018/0162651 A1 Jun. 14, 2018

Related U.S. Application Data

(60) Provisional application No. 62/404,589, filed on Oct. 5, 2016.

(51) Int. Cl.
| | |
|---|---|
| *B65G 43/06* | (2006.01) |
| *B65G 17/48* | (2006.01) |
| *A21B 1/46* | (2006.01) |
| *B65G 17/38* | (2006.01) |
| *B65G 43/02* | (2006.01) |
| *B65G 45/08* | (2006.01) |

(52) U.S. Cl.
CPC ............... *B65G 43/06* (2013.01); *A21B 1/46* (2013.01); *B65G 17/385* (2013.01); *B65G 17/48* (2013.01); *B65G 43/02* (2013.01); *B65G 45/08* (2013.01); *B65G 2203/0275* (2013.01); *B65G 2203/0283* (2013.01); *B65G 2203/042* (2013.01)

(58) Field of Classification Search
CPC ......... B65G 43/00; B65G 43/02; B65G 43/06
USPC ........................................ 198/502.3; 110/193
See application file for complete search history.

(56) References Cited

U.S. PATENT DOCUMENTS

| | | | |
|---|---|---|---|
| 4,368,803 A | 1/1983 | Dombroski et al. | |
| 5,820,266 A | 10/1998 | Fedak | |
| 9,440,797 B1 | 9/2016 | Rimmington | |
| 2002/0027061 A1 | 3/2002 | Kilby et al. | |
| 2004/0050667 A1* | 3/2004 | Wiese ................ | B65G 17/18 198/498 |
| 2007/0241165 A1* | 10/2007 | Deram ................ | B23K 1/203 228/101 |
| 2008/0230532 A1 | 9/2008 | Kozman et al. | |
| 2009/0208892 A1* | 8/2009 | Kozman ............. | A21B 1/48 432/146 |

(Continued)

OTHER PUBLICATIONS

"International Search Report," for PCT Patent Application No. PCT/US17/55424, dated Feb. 6, 2018, 4 pages.

(Continued)

*Primary Examiner* — Gene O Crawford
*Assistant Examiner* — Lester Rushin, III
(74) *Attorney, Agent, or Firm* — Kirby Drake

(57) ABSTRACT

A monitoring and feedback system may provide real-time feedback on the bearings in the chain of a proofer/oven conveyor system. The system may detect a bearing seizure before any damage can occur to the track and/or may provide for improper lubrication detection. Accordingly, a chain section or a bearing may be pulled out of the conveyor system for repair/replacement, thereby prolonging the life of the conveyor system as a whole, including the conveyor chain and bearings.

16 Claims, 8 Drawing Sheets

(56) References Cited

U.S. PATENT DOCUMENTS

2012/0111978 A1* 5/2012 Murphy ................. B02C 15/04
241/25

OTHER PUBLICATIONS

"Written Opinion of the International Search Authority," for PCT Patent Application No. PCT/US17/55424, dated Feb. 6, 2018, 6 pages.

\* cited by examiner

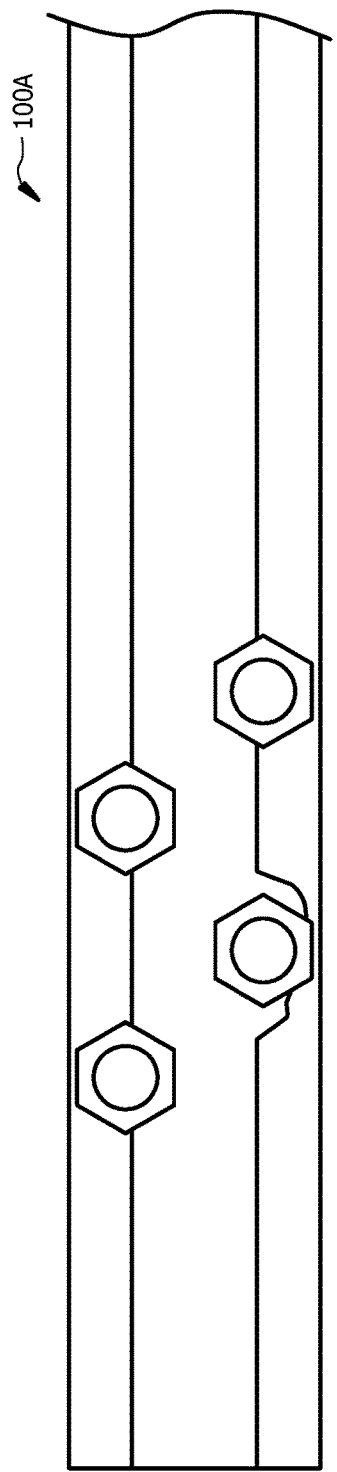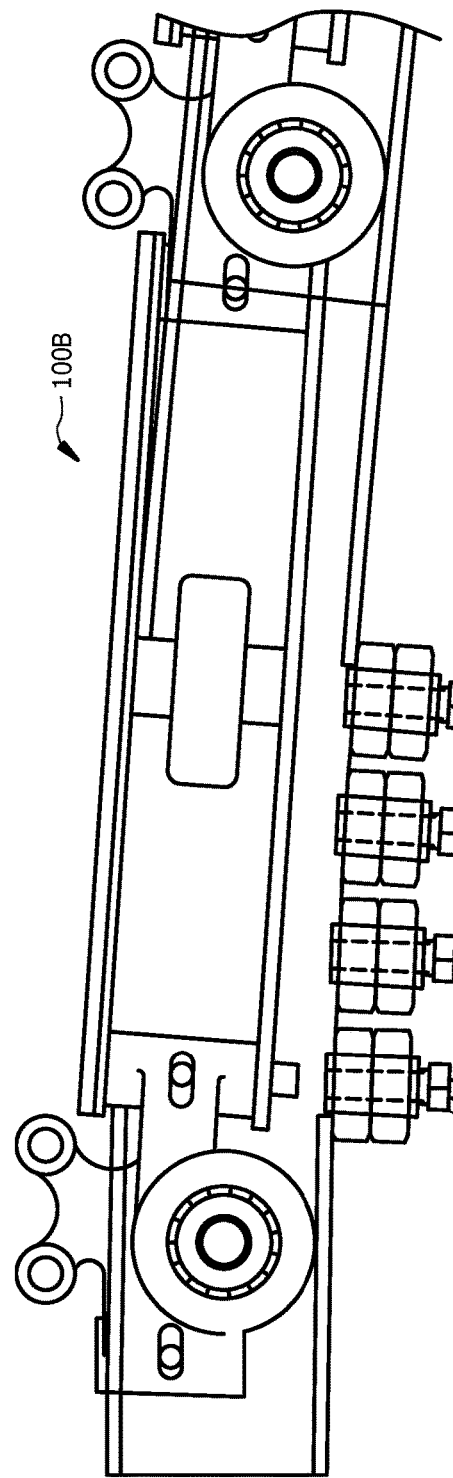

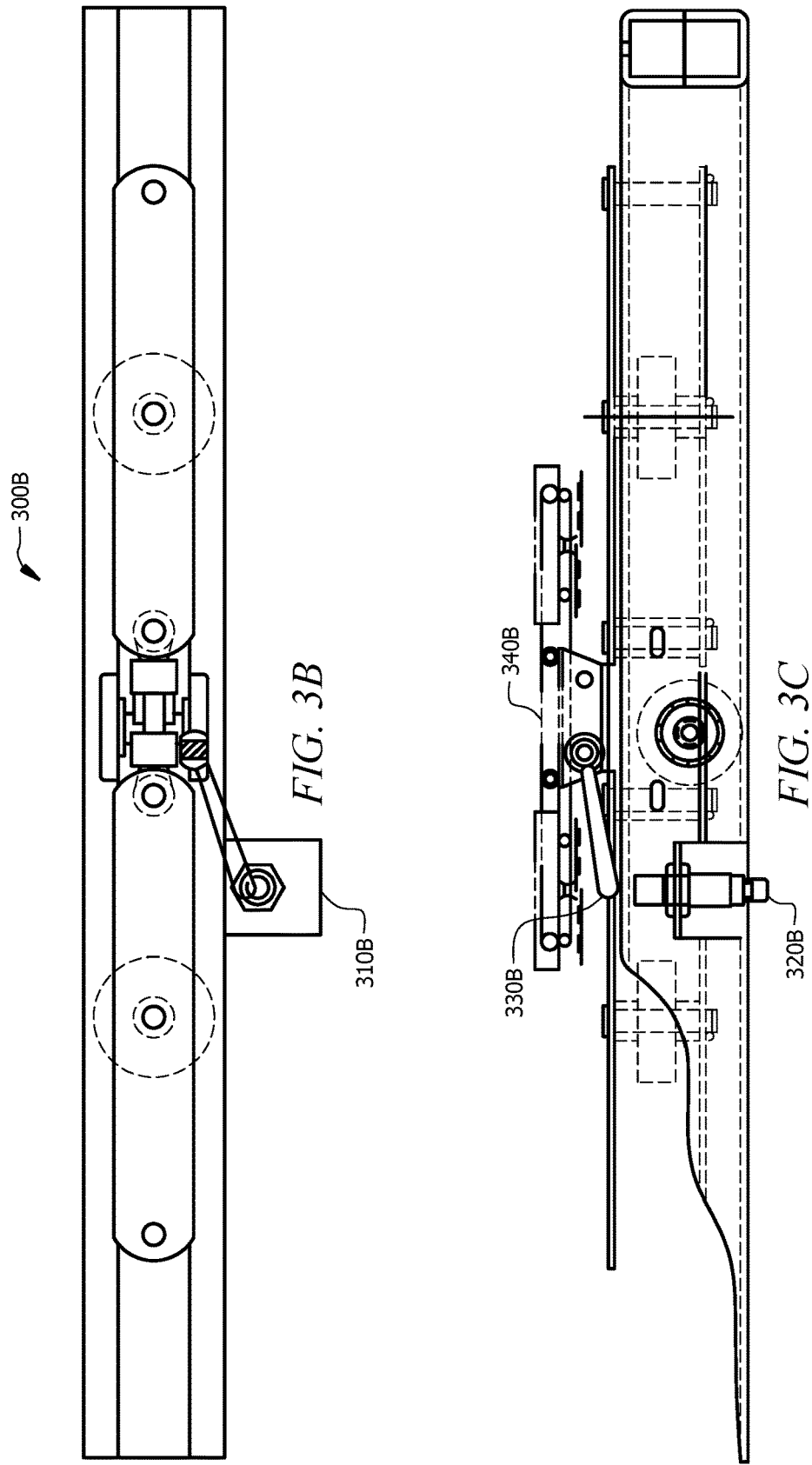

CHAIN MONITORING SYSTEM

CROSS REFERENCE TO RELATED APPLICATION

This application claims the benefit under 35 U.S.C. § 119(e) of U.S. Provisional Patent Application Ser. No. 62/404,589 filed on Oct. 5, 2016, entitled "Chain Monitoring and Feedback System," which is incorporated by reference in its entirety.

FIELD OF THE DISCLOSURE

The present disclosure generally relates to monitoring and providing feedback, and more particularly to chain monitoring and providing feedback in a proofer/oven conveyor system.

BACKGROUND

Modern large-scale commercial bakeries of the type utilized in the production of bread, sandwich buns, and similar dough products are frequently equipped with a continuous proofing and baking apparatus. Dough to be baked is received in bakery pans. The bakery pans are transported using a conveyor system. The conveyor system may include a track and a conveyor chain for movement along the track through a proofer wherein the dough may rise and/or through an oven wherein the dough may be baked. The conveyor chain may include one or more bearings that assist with movement along the track. Lubricating the chain also can be time-consuming and expensive, and often can be overlooked by bakery operators. Lack of lubrication can lead to bearing failure which, at a minimum, requires the conveyor system to be taken out of service to facilitate repair/replacement of the failed bearings. There also may be times where bearings seize causing increased load on the conveyor system and increased chain and track wear requiring the conveyor system to be taken offline for repair/replacement of the bearing leading to delays in manufacturing.

SUMMARY

Embodiments of the present disclosure may provide a chain monitoring system including a conveyor that may be arranged to move from an upstream position to a downstream position. The system may include a chain that may be provided along the conveyor, and the chain may be separated into a plurality of chain sections. Each of the plurality of chain sections may be capable of being removed from the chain. The system may include a plurality of pitches that may be provided along the conveyor, and each of the plurality of pitches may contain a horizontal bearing and a set of two vertical bearings. The horizontal bearing may be arranged toward the center of each of the plurality of pitches, and the set of two vertical bearings may be arranged on a trailing side of each of the plurality of pitches. Each of the plurality of pitches may be capable of being removed from the conveyor after a starting pitch may be jogged to a maintenance position. Any of the horizontal bearing and the set of two vertical bearings may be capable of being removed from the conveyor. The system may provide a flag assembly that may be provided on the conveyor, and the flag assembly may indicate whether any of the horizontal bearing and the set of two vertical bearings may require maintenance or replacement. The system may include a first array of thermocouples for the horizontal bearing, and a second and a third array of thermocouples may be provided for the set of two vertical bearings that may be arranged downstream of a lubrication system. The first, second, and third thermocouples may provide thermal trends of each bearing that may be monitored and tracked. The system may include at least one upstream horizontal thermocouple that may be arranged downstream of at least one upstream vertical thermocouple. The system may further include an oiler that may be arranged downstream of the at least one upstream horizontal thermocouple and the at least one upstream vertical thermocouple, and a home sensor that may be arranged downstream of the oiler. The system may include a maintenance module that may be arranged downstream of the home sensor. At least one downstream horizontal thermocouple may be arranged downstream of the maintenance module, and at least one downstream vertical thermocouple may be arranged downstream of the at least one downstream horizontal thermocouple. The system may include a plurality of interactive display screens that may include a home screen, a trends screen, a sensors screen, an active chain screen, and an alarms screen. The system may include the plurality of interactive display screens that may provide real-time data on bearing temperatures, pitch temperatures, and maintenance alarms.

Other embodiments of the present disclosure may provide a conveyor system that may include a conveyor that may be arranged to move from an upstream position to a downstream position. The conveyor system may include a proofer or an oven that may provide a load-on position and a load-off position. The load-on position may be the starting point for the conveyor, and the load-off position may be the ending point. A chain may be provided along the conveyor, and the chain separated may be into a plurality of chain sections. Each of the plurality of chain sections may be capable of being removed from the chain. The system may include a plurality of pitches that may be provided along the conveyor, and each of the plurality of pitches may contain a horizontal bearing and a set of two vertical bearings. The horizontal bearing may be arranged toward the center of each of the plurality of pitches, and the set of two vertical bearings may be arranged on a trailing side of each of the plurality of pitches. The system may include a feedback mechanism that may be arranged to continuously monitor thermal trends of any of the horizontal bearing and the set of two vertical bearings and may compare upstream and downstream data. Each of the plurality of pitches may be capable of being removed from the conveyor after a starting pitch may be jogged to a maintenance position. Any of the horizontal bearing and the set of two vertical bearings may be capable of being removed from the conveyor. The system may include a plurality of thermocouples that may be positioned along the conveyor and may be arranged to measure a temperature at various points on the conveyor. A temperature change of approximately 0.2 second at any thermocouple may result in a flag being displayed to service the system. The system may include a plurality of interactive display screens that may include a home screen, a trends screen, a sensors screen, an active chain screen, and an alarms screen.

Other technical features may be readily apparent to one skilled in the art from the following drawings, descriptions and claims.

BRIEF DESCRIPTION OF THE DRAWINGS

For a more complete understanding of this disclosure, reference is now made to the following description, taken in conjunction with the accompanying drawings, in which:

FIG. 1A depicts a top view of a conveyor system according to an embodiment of the present disclosure;

FIG. 1B depicts a side view of a conveyor system according to an embodiment of the present disclosure;

FIG. 3B depicts a top view of a flag assembly for a chain monitoring system according to an embodiment of the present disclosure;

FIG. 3C depicts another view of a flag assembly for a chain monitoring system according to an embodiment of the present disclosure;

DETAILED DESCRIPTION

Embodiments of the present disclosure may provide monitoring and feedback in a proofer/oven conveyor system. Embodiments of the present disclosure may provide real-time feedback as to the bearings of a conveyor chain that assists in movement along the track of the conveyor system. Embodiments of the present disclosure may detect a bearing seizure before any damage can occur to the track. Additional embodiments of the present disclosure also may provide for improper lubrication detection. Accordingly, a chain section and/or a bearing may be removed from the conveyor system for repair/replacement, thereby prolonging the life of the conveyor system as a whole, including the conveyor chain and bearings.

Figure 1C:
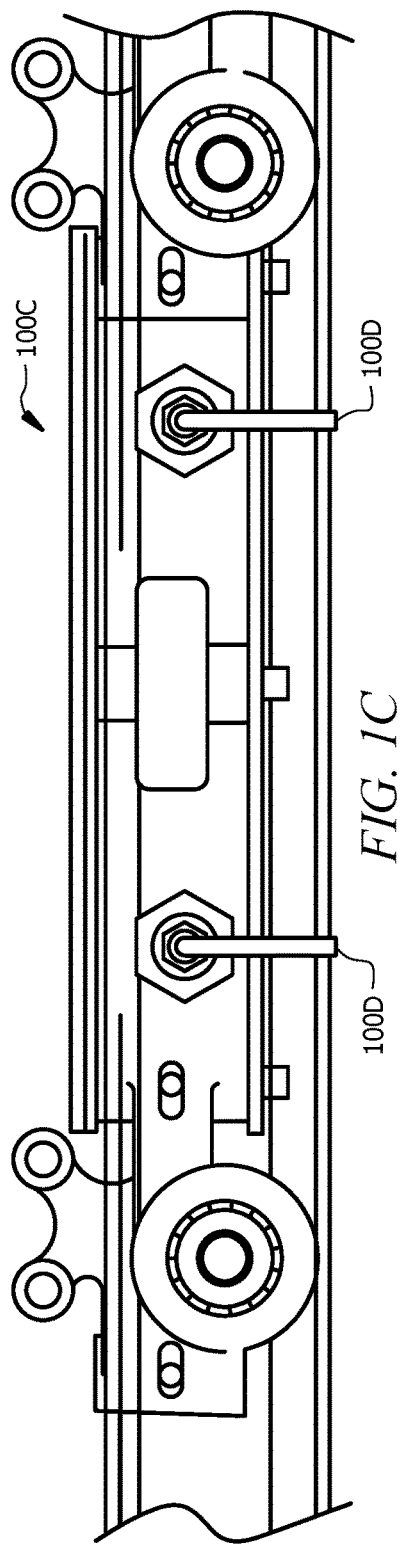
FIG. 1C depicts another side view of a conveyor system according to an embodiment of the present disclosure.

FIGS. 1A-1C depict conveyor system 100A, 100B, 100C according to an embodiment of the present disclosure. FIG. 1A depicts a top view of conveyor system 100A with a vertical break, FIG. 1B depicts a side view of conveyor system 100B with a vertical break, and FIG. 1C depicts a side view of conveyor system 100C with an inner curve. As depicted in FIGS. 1A-1C, conveyor system 100A, 100B, 100C may be formed in a loop-like shape having curved portions and straight portions. Conveyor system 100A, 100B, 100C may begin at load-on position 110 of proofer/oven 100F (FIG. 1F) and may end at load-off position 120.

Figure 1E:
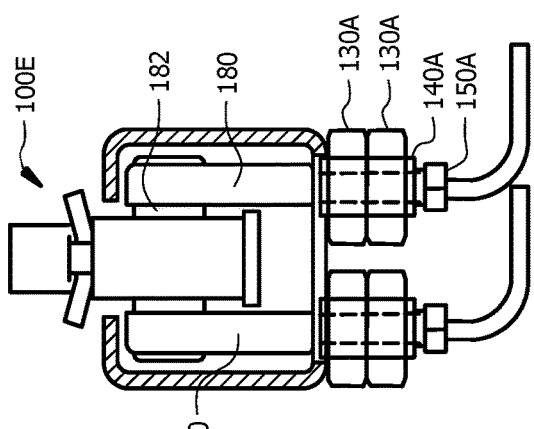
FIG. 1E depicts a vertical bearing position in a conveyor system according to an embodiment of the present disclosure.

FIGS. 1A-1C depict exploded views around the end point of conveyor system 100A, 100B, 100C according to an embodiment of the present disclosure. As depicted in conveyor systems 100D, 100E of FIGS. 1D-1E respectively, two vertical bearings 180 are provided, and both vertical bearings 180 may run continuously along the bottom of a vertical break. It should be appreciated that the dimensions of conveyor system 100A, 100B, 100C may change without departing from the present disclosure. Indications of placement of thermocouples (T/Cs) 150A (FIG. 1E), 150B (FIG. 1D), T/C well assemblies 140A (FIG. 1E), 140B (FIG. 1D), and jam nuts 130A (FIG. 1E), 130B (FIG. 1D) at the end point are provided according to an embodiment of the present disclosure; however, the exact placement may change without departing from the present disclosure.

Figure 1D:
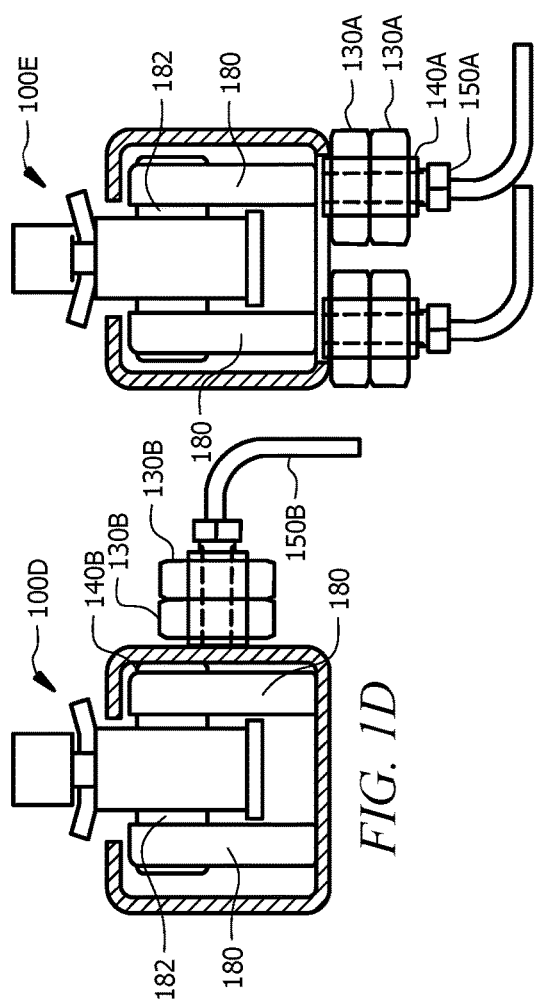
FIG. 1D depicts a horizontal bearing position in a conveyor system according to an embodiment of the present disclosure.

Conveyor system 100A, 100B, 100C may be formed in a loop-like shape having curved portions. Examples of those curved portions according to an embodiment of the present disclosure are depicted in FIG. 1C. Further, side view of an inner curve of conveyor system 100C according to an embodiment of the present disclosure also is depicted in FIG. 1C. Like the starting point and the end point, these curved portions also may include one or more T/Cs 150B (FIG. 1D), one or more T/C well assemblies 140B (FIG. 1D), and plurality of jam nuts 130B (FIG. 1D). It should be appreciated that the type of jam nut may vary depending on whether the conveyor system is being used as a proofer track or an oven track. In this embodiment of the present disclosure, each curved portion may include two Type J T/Cs with special tip 150B, two T/C well assemblies 140B, and four jam nuts 130B; however, more or fewer of each component may be utilized without departing from the present disclosure. As depicted herein, horizontal bearing 182 (FIGS. 1D, 1E) may run continuously along the inside wall of the curved portion of conveyor system 100C.

FIG. 1B depicts an exploded view around a vertical break of conveyor system 100B according to an embodiment of the present disclosure. As depicted herein, vertical bearings 180 (FIGS. 1D, 1E) may run continuously along the inside wall of the curved portion of conveyor system 100B. Conveyor system 100B may include placement of one or more T/Cs 150A (FIG. 1E), one or more T/C well assemblies 140A (FIG. 1E), and plurality of jam nuts 130A (FIG. 1E) in a curved portion of the conveyor track according to an embodiment of the present disclosure. It should be appreciated that the exact placement may vary without departing from the present disclosure.

Conveyor system 100A, 100B, 100C also may include a flag assembly according to embodiments of the present disclosure. This flag assembly may be provided on the straight portion of conveyor system 100A, 100B, and 100C, as depicted in FIGS. 1A, 1B, and 1C. However, it should be appreciated that a flag assembly may be placed in other regions of the conveyor system without departing from the present disclosure. Also, while only one flag assembly is depicted as part of the chain monitoring system of FIGS. 1A, 1B, and 1C, it should be appreciated that more than one flag assembly may be incorporated without departing from the present disclosure.

Figure 1F:
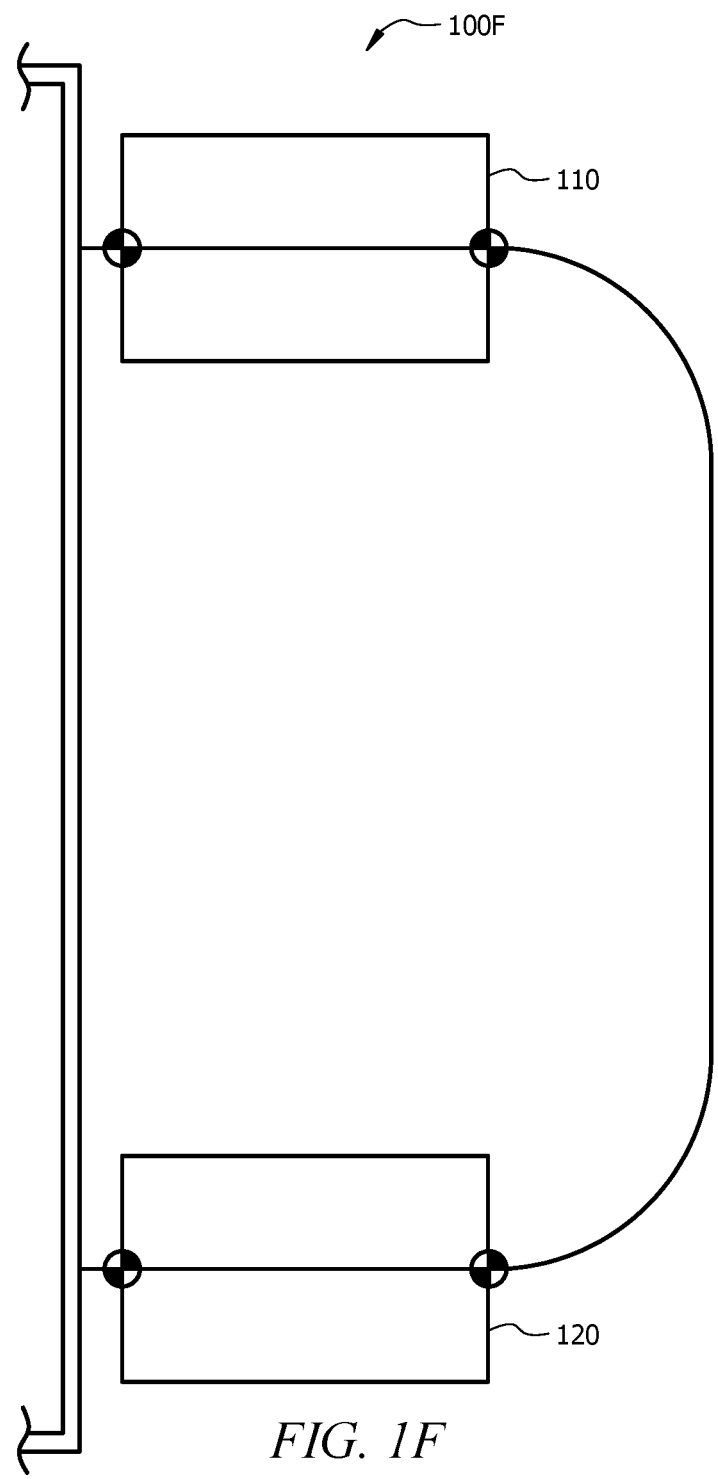
FIG. 1F depicts a proofer/oven according to an embodiment of the present disclosure.
Figure 2A:
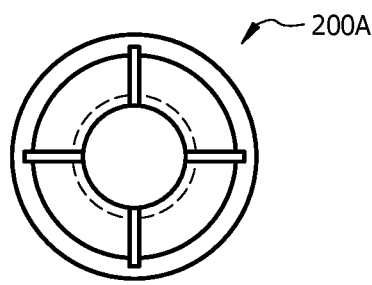
FIG. 2A depicts an end view of a thermocouple well assembly for a chain monitoring system according to an embodiment of the present disclosure.
Figure 2B:
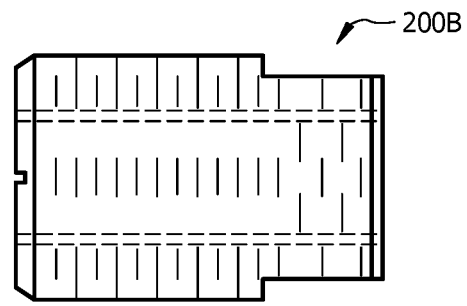
FIG. 2B depicts a profile view of a thermocouple well assembly for a chain monitoring system according to an embodiment of the present disclosure.
Figure 2C:
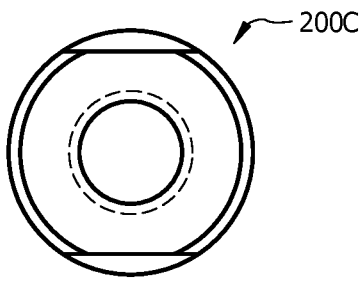
FIG. 2C depicts an end view of a thermocouple well assembly for a chain monitoring system according to an embodiment of the present disclosure.
Figure 2D:
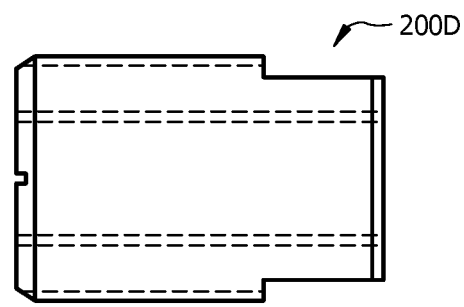
FIG. 2D depicts a profile view of a thermocouple well assembly for a chain monitoring system according to an embodiment of the present disclosure.
Figure 2E:
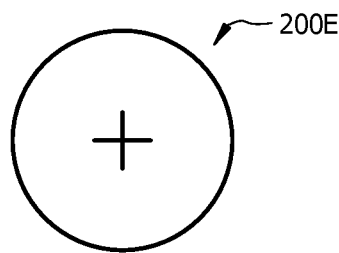
FIG. 2E depicts an end view of a thermocouple well assembly for a chain monitoring system according to an embodiment of the present disclosure.
Figure 2F:
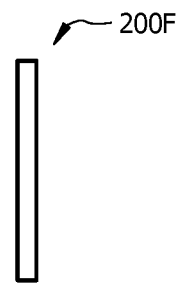
FIG. 2F depicts a profile view of a thermocouple well assembly for a chain monitoring system according to an embodiment of the present disclosure.
Figure 7:
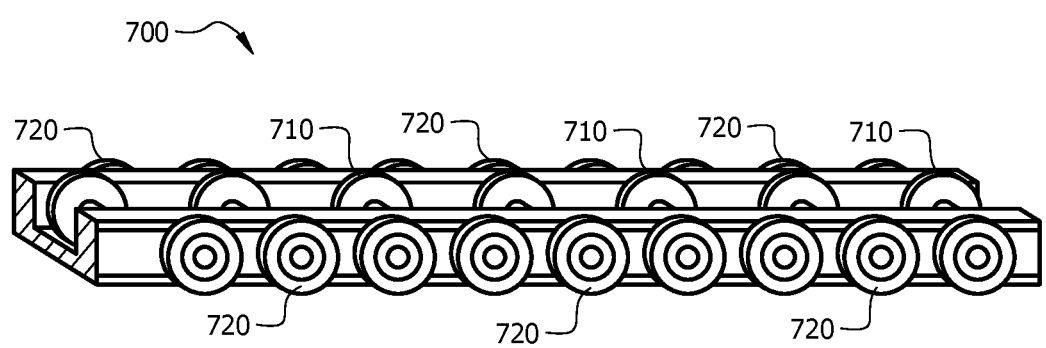
FIG. 7 depicts a conveyor for a chain monitoring system according to an embodiment of the present disclosure.

FIG. 1F depicts proofer/oven 100F according to an embodiment of the present disclosure. Proofer/oven 100F load-on position 110 may provide a starting point for conveyor 100A, 100B, and 100C and proofer/oven 100F load-off position 120 may provide an end point for conveyor system 100A, 100B, and 100C. Load-on position 110 and load-off position 120 may include plurality of T/Cs 140A (FIG. 1E), 140B (FIG. 1D). T/Cs 140A (FIG. 1E), 140B (FIG. 1D) may be a widely used type of temperature sensor and may assist in measuring temperature at various points on conveyor track (FIG. 7). In some embodiments of the present disclosure, both load-on position 110 and load-off position 120 may have plurality of Type J T/Cs 150A (FIG. 1E), 150B (FIG. 1D). It should be appreciated that 4 Type J T/Cs 150A, 150B may provide a special tip that may be provided at load-on position 110 and/or at load-off position 120; however, more or fewer T/Cs may be provided without departing from the present disclosure. It also should be appreciated that different types of T/Cs may be utilized without departing from the present disclosure. Load-on position 110 and load-off position 120 may include plurality of jam nuts 130A, 130B wherein the type of jam nut may vary depending on whether conveyor system 100A (FIG. 1A), 100B (FIG. 1B), and 100C (FIG. 1C) is being used as a proofer track or an oven track. In this embodiment of the present disclosure, approximately 8 jam nuts 130A (FIG. 1E), 130B (FIG. 1D) may be utilized at each of the starting and end points; however, it should be appreciated that more or fewer jam nuts may be utilized without departing from the present disclosure. It also may be appreciated that a different type of locking mechanism other than jam nut 130A, 130B may be utilized without departing from the present disclosure, including, but not limited to, locknuts, lock washers, and thread-locking fluid. Operation of T/C 150A, 150B may require that its tip be placed directly in the space where temperature is measured or in direct contact with a surface. To avoid destruction of a tip, T/C well assembly 140A, 140B may provide a means to mount a T/C without leading to damage. Accordingly, the starting point and the end point also may include one or more T/C well assemblies 140A, 140B. In this embodiment of the present disclosure, both the starting and end points in FIG. 1F are depicted as having two T/C well assemblies 140A, 140B; however, there may be embodiments where more or fewer T/C well assemblies may be utilized without departing from the present disclosure.

FIGS. 2A-2F may depict T/C well assemblies 200A-200F, respectively, for conveyor systems 100A (FIG. 1A), 100B (FIG. 1B), and 100C (FIG. 1C) according to an embodiment of the present disclosure. More specifically, FIGS. 2A-2F may depict T/C well assemblies 200A-200F from different perspectives including end views (FIGS. 2A, 2C, and 200E) and profile views of the head (FIG. 2B, 2D) and body (FIG. 2F) respectively. While various dimensions are depicted in FIGS. 2A-2F, it should be appreciated that the dimensions may change depending on the needs of the system without departing from the present disclosure.

Figure 3A:
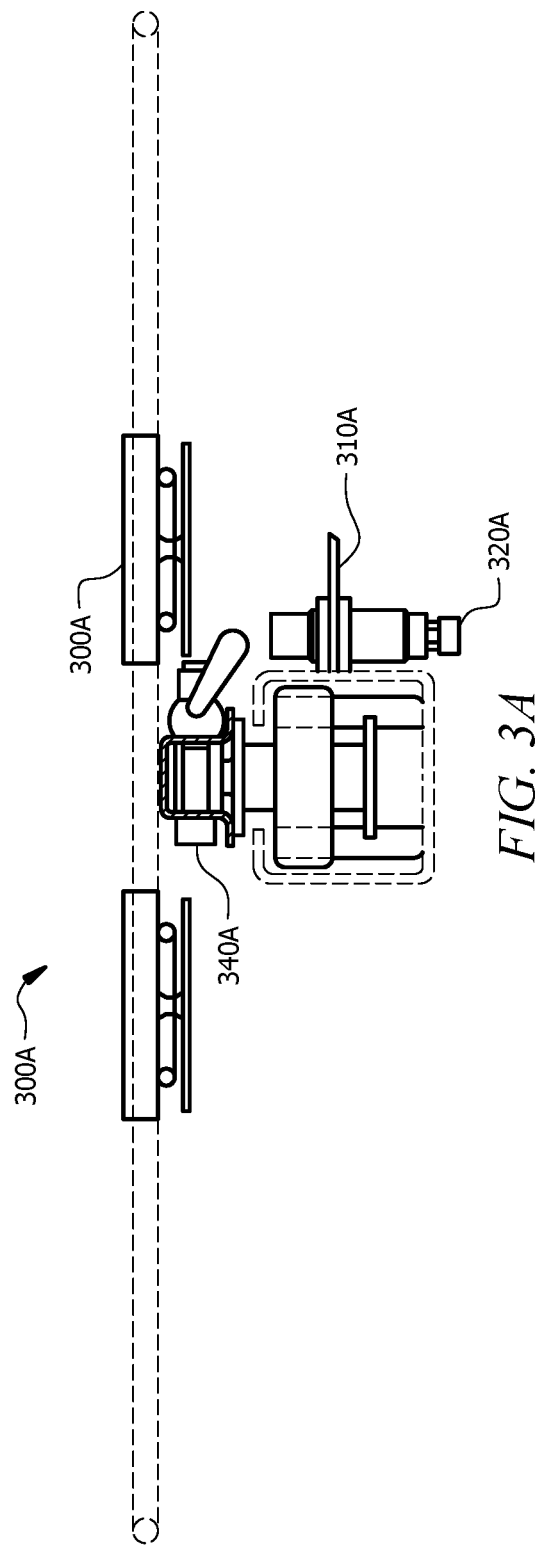
FIG. 3A depicts a side view of a flag assembly for a chain monitoring system according to an embodiment of the present disclosure.

FIGS. 3A, 3B, and 3C may depict several exploded views of flag assembly 300A, 300B according to an embodiment of the present disclosure. Flag assembly 300A, 300B according to an embodiment of the present disclosure may include proximity indicator with a cable 320A, 320B. Flag assembly 300A, 300B may also include sensor mounting angle 310A, 310B, handle nut 330A, 330B as well as screw/nut 340A, 340B to fasten handle nut in place. While specific dimensions and placements of components within flag assembly 300A, 300B are depicted in FIGS. 3A-3C, it should be appreciated that the dimensions and placement may change without departing from the present disclosure. Further, while certain fastening mechanisms have been identified herein, others may be utilized without departing from the present disclosure.

It should be appreciated that embodiments of the present disclosure may provide a feedback mechanism for oven/proofer conveyor systems that may provide real-time feedback on bearings in the chains. Such a mechanism may allow for both seized bearing detection and/or improper lubrication detection.

With respect to seized bearing detection, when a seized bearing crosses the T/C array, it may create a thermal ripple effect of significantly greater amplitude than a rolling bearing. Once detected, an incident timer may be initiated. Using the speed and length of the chain, the feedback mechanism may define a target time window for successive repeat occurrences. If the occurrence repeats within the expected time window on two successive round trips, then the feedback mechanism may provide an alert/alarm but continue to run. Multiple concurrent incidents may then be monitored with mutually exclusive incident timers. It should be appreciated that each T/C array may act independently of the other arrays, allowing the feedback mechanism to quickly direct the operator to the exact location of the target bearing. Logic can be included within the system according to some embodiments of the present disclosure that may command the system to stop the target bearing at a desired location, such as an inspection station.

Figure 4:
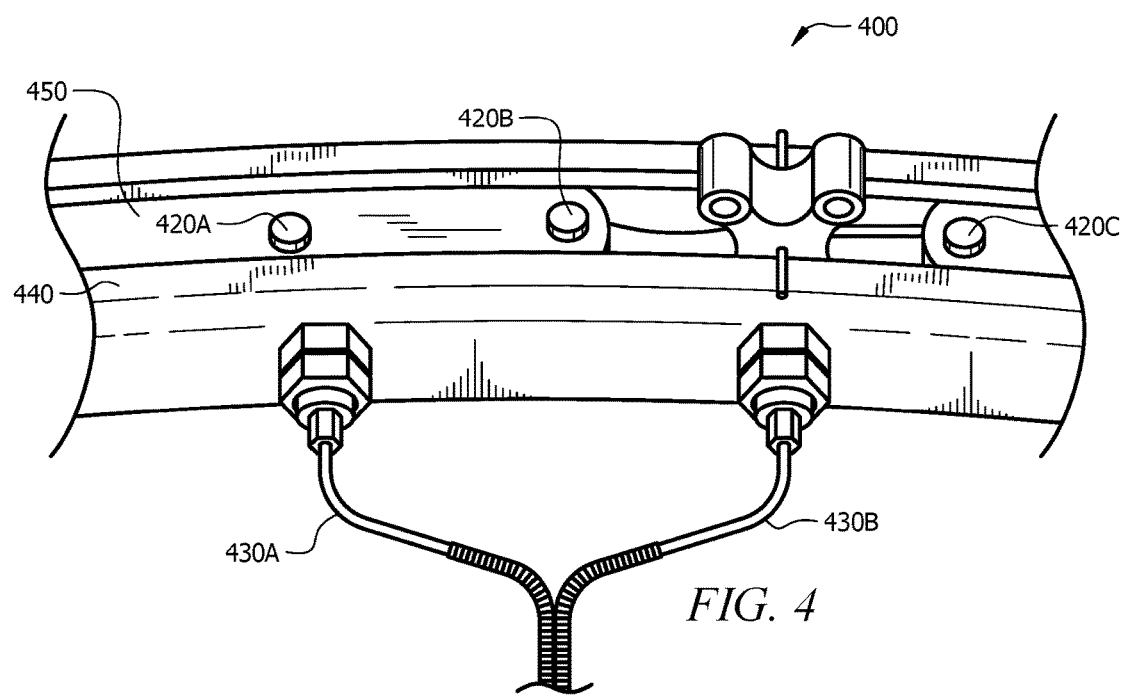
FIG. 4 depicts a chain monitoring system including a thermocouple according to an embodiment of the present disclosure.

FIG. 4 depicts conveyor system 400 including T/C array 430A, 430B according to an embodiment of the present disclosure. With respect to improper lubrication detection, T/C array 430A, 430B for each bearing set 420A, 402B, 420C may be placed downstream of the lubrication system on an inactive section of chain 440 in a similar attitude to track 450 as seized bearing T/C arrays. The feedback mechanism may continuously monitor the thermal trends of each bearing set 420A, 420B, and 420C. Bearing 420A may be a horizontal bearing just upstream of T/C 430A. It should be appreciated that 2 vertical bearings and 1 horizontal bearing may be included without departing from the present disclosure; however, more or fewer bearings may be utilized without departing from the present disclosure. A user may log the high, low and average running temperatures at the upstream (seized bearing arrays) and downstream (lube bearing arrays) locations. The feedback mechanism may continuously compare the upstream and downstream data in light of the lubrication cycles. When the chain runs unlubricated (or is under-lubricated), the delta between the upstream and downstream locations may tend to be smaller than just after a lubrication cycle. By comparing various data (current and historical), it may be possible to determine if the rate of change of one set of bearings is similar to the rate of change in other sets of bearings and/or if the rate of change is similar to the historical rate of change in that same bearing set. If the rate of change is not proportional, then the feedback mechanism may provide an alert/alarm but continue to run.

By having such a system, when high temperatures are detected (indicating dragging), the oven/proofer conveyor track can be stopped, and a chain section can be pulled out for replacement. Thus, embodiments of the present disclosure may provide a passive system to alert of bad bearings so that they may be changed one at a time. In other embodiments of the present disclosure, all of the bad bearings may be replaced all in one cycle. This also may prolong the life of a bearing within a chain system.

While embodiments of the present disclosure have been described as providing a passive system, it should be appreciated that in some embodiments of the present disclosure, the system may be an active system that may allow the user (such as a bakery operator) to index a seized bearing and may be immediately replaced within a short period of time. In some embodiments of the present disclosure, this replacement may be performed within approximately 30 seconds while the equipment remains in operation.

Figure 5:
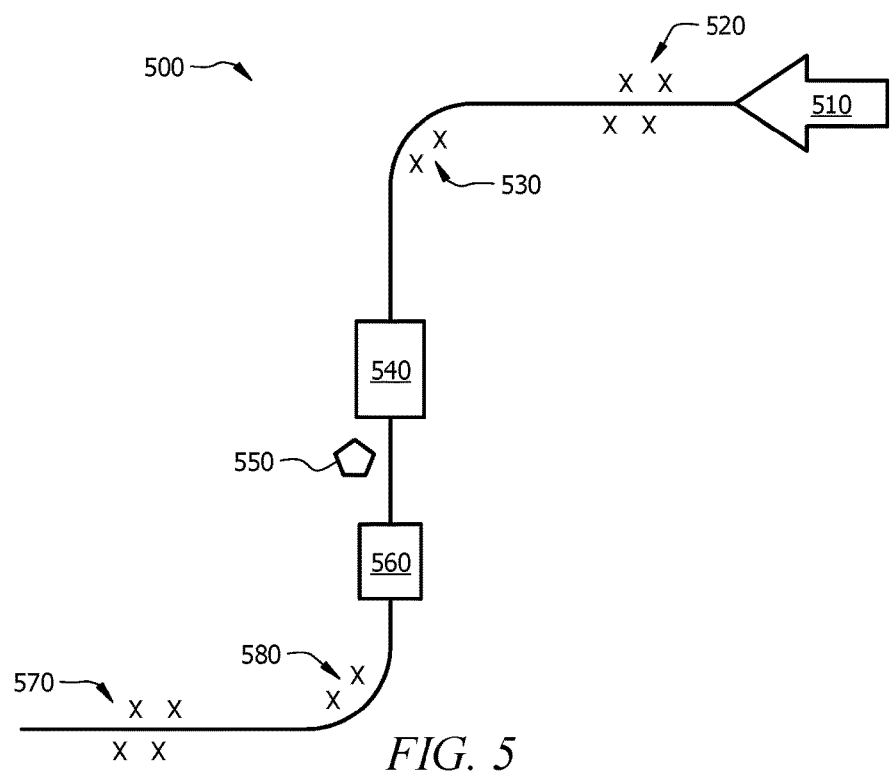
FIG. 5 depicts a conveyor system in a chain monitoring system according to an embodiment of the present disclosure.

FIG. 5 depicts conveyor system 500 according to an embodiment of the present disclosure. Conveyor system 500 may provide flow 510 from upstream vertical T/Cs 520 to downstream vertical T/Cs 570. Conveyor system 500 may provide devices in a default setup in an order of upstream vertical t T/Cs 520, upstream horizontal T/Cs 530, oiler 540, home sensor 550, maintenance module 560, downstream horizontal T/Cs 580, and downstream vertical T/Cs 570. A conveyor in conveyor system 500 may move from an upstream direction to a downstream direction. It should be appreciated that pitches may enter an oven and may be downstream of a motor. It should further be appreciated that pitches leaving the oven may be upstream of the motor in some embodiments of the present disclosure.

Figure 6:
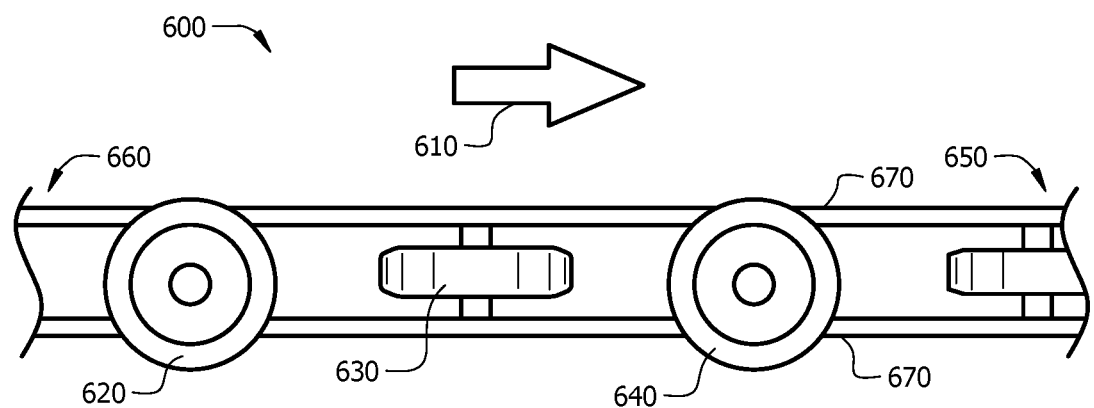
FIG. 6 depicts bearings in a chain monitoring system according to an embodiment of the present disclosure.

FIG. 6 depicts pitch setup 600 in a conveyor system. Every fifth bearing may be marked by a user when setting up conveyor system 500 (FIG. 5). Marking every fifth bearing may provide the advantage of facilitating the user in checking offsets that may be set on a maintenance screen. The user may jog the conveyor at a low speed and may number every fifth pitch using a marking instrument, such as chalk. The user may set locations of each device in conveyor system 500 relative to a home sensor by using offsets of the maintenance screen. Offsets may be measured by a number of pitches that may be provided between each position of every pitch. It should be appreciated that offsets may be programmed in actual pitches of separation. Pitch 610 may contain horizontal bearing 630 and set of two vertical bearings 620. Horizontal bearing 630 may be provided in the middle of flat bars 670 on pitch 610, and vertical bearings 620 may be provided on trailing side or upstream 660 of pitch 610. It should be appreciated that additional pitches may be provided with the same arrangement of horizontal and vertical bearings. It should also be appreciated that up to approximately 20 pitches may be removed per segment. It should further be appreciated that no pitches may be removed until a starting pitch is jogged to a maintenance position.

FIG. 7 depicts conveyor 700 of a conveyor system according to an embodiment of the present disclosure. A plurality of bearings 710 and a plurality of pitches 720 may be equally spaced along conveyor 700. It should be appreciated that in some embodiments of the present disclosure, an offset may be correctly determined by jogging the conveyor so that a home flag may be located on a trailing side of a first pitch, which may be provided above the home sensor or proximity switch. If the sensor is located exactly above the proximity switch, the user may add or subtract the difference in distance with determining offsets. The user may count the number of pitches from the home position to the oiler position, the maintenance position, and each thermocouple array location. Offset values may all be positive if device locations are all upstream and/or downstream of the home position. The user may input a negative offset value when a device is upstream of the home sensor and positioned downstream of a field, or vice versa. When a home flag is positioned directly above the home sensor, a pitch that should be counted for an offset may be a pitch in which a corresponding bearing may be immediately upstream of the position of the pitch or thermocouple. A user may select a maintenance position in which flagged bearing may be jogged and segments of the chain may be removed. Rather than service the conveyor one bearing at a time, the user may remove contiguous segments of the chain and service them all at one time. It should be appreciated that $\frac{1}{26}$ of the chain may be removed and cleaned approximately every two weeks. It should also be appreciated that when the user removes a segment of the chain, the segment removed may be kept in storage while a spare segment or length of the chain may take the place of the segment removed. It should further be appreciated that the segment may be stored and reintroduced into the conveyor. The user may set the maintenance position at a section of the track where the chain is exposed or at the motor. It should be appreciated that a maintenance screen may be utilized to set values for each offset. The values for each offset may be set using a maintenance screen, and the current pitch may be observed.

It should be appreciated that in some embodiments of the present disclosure, a quantity of pitches in the conveyor system may be automatically detected. To detect the quantity of pitches, a home flag may be installed at a first pitch and may pass a proximity switch and home sensor. It should be appreciated that debris and loose parts may cause readings to be incorrect and/or false flags to be detected. It should be appreciated that when the home sensor is functioning properly and false flags are resolved, the chain monitoring system or chain may be scanned to detect the quantity of pitches using a button on a maintenance screen. It should be appreciated that a programmable logic controller (PLC) may begin a pitch scan routine and may wait for the home flag to pass the home sensor. It should further be appreciated that when the flag passes the home sensor, a counter may count every pitch until another flag passes the home sensor again in some embodiments of the present disclosure.

It should be appreciated that in some embodiments of the present disclosure, a home screen may provide an overview of the chain monitoring system. It should be appreciated that the home screen may include a process temperature display that may provide the operating temperature of the oven or proofer. It should also be appreciated that the home screen may provide a bearing status box that may provide a user with an overview of bearing positions and a total number of sick or malfunctioning bearings that may be detected in the system. It should further be appreciated that average and high temperatures that may be read by each thermocouple position may be displayed. It should be appreciated that the home screen may provide a lubrication overview that may display a quantity of oil cycles and an average oil cycle duration for a selected day and/or week. It should also be appreciated that the home screen may provide a sensor overview that may display a quantity of sick or malfunctioning thermocouples in which the temperature may vary greatly from other thermocouples in the chain monitoring system. It should further be appreciated that the home screen may provide a navigator tool bar.

It should be appreciated that in some embodiments of the present disclosure, a trends screen may display a temperature history for each set of thermocouples in the chain monitoring system. It should be appreciated that in some embodiments of the present disclosure, a sensors screen may display a temperature and health reading of each sensor in the chain monitoring system. It should be appreciated that a sick or malfunctioning sensor may automatically be reset if its reading is within an acceptable deviation from an average of the remaining thermocouples in the chain monitoring system. It should be appreciated that a temperature difference between two sensors in a pair may be monitored. If a temperature of one thermocouple is less than the temperature of the other thermocouple, then the thermocouple with the lower temperature may be determined to have loosened from the track and may not be in contact with the chain monitoring system. An alarm may be triggered to alert the user of a loose thermocouple.

It should be appreciated that in some embodiments of the present disclosure, an active chain screen may be provided to allow a user to navigate to any bearing in the active chain. It should be appreciated that only the number of bearings available in the active system may appear on the active chain screen. It should also be appreciated that there may be more pitches utilized in the chain monitoring system than can fit on the active chain screen, and additional active chain screen navigation buttons may provide a user with access to the remaining pitches. It should be appreciated that the active chain screen and/or a bearing alarm screen may display a list of pitches, the temperature for each bearing on each pitch, a flag count which may indicate the number of times that each bearing may have a high temperature trigger, and service information that may indicate the number of times each bearing may have been cleaned in place in the system and/or cleaned out of place. It should be appreciated that a bearing storage and a chain segment menu may be provided and each menu may provide pitch, identification, and service information.

It should be appreciated that in some embodiments of the present disclosure, a maintenance screen may be provided and may allow a user to make changes to configurations of the chain monitoring system. It should be appreciated that the maintenance screen may display offsets that may allow the user to set locations of thermocouple arrays. It should further be appreciated that vertical and horizontal change in temperature values may be displayed and may set a temperature change threshold for detecting and flagging a seized bearing. It should also be appreciated that a temperature change of approximately 0.2 seconds at any selected thermocouple may result in a high temperature flag being displayed. The maintenance screen may also provide information regarding an amount of time that the system may wait after switching between primary and secondary thermocouples before looking for high temperature flags again to prevent false flags during switching. A loose thermocouple alarm and a temperature difference for determining a loose thermocouple may be provided. An amount of time that a thermocouple may be out of an acceptable temperature range before an alarm is triggered may be provided. A jog speed at which the system may request for the oven or proofer PLC to jog the system may be provided. High and low temperature values for each bearing may be provided and may be reset. A reset chain button may enable an automated scan function and may count every pitch in the conveyor to determine a total number of pitches for track bearings. A jog to bearing button may be provided that may allow the user to jog any bearing.

It should be appreciated that in some embodiments of the present disclosure, a bearings alarm screen may be provided. It should be appreciated that when a bearing is flagged, an alarm may be displayed, and a user may access details regarding the alarm. It should also be appreciated that the bearings alarm screen may allow the user to make a selection regarding jogging the system, cleaning bearings in place or out of place, and retiring bearings among other actions.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A chain monitoring system comprising:
 a conveyor arranged to move from an upstream position to a downstream position;
 a plurality of pitches provided along the conveyor, wherein each of the plurality of pitches contains a horizontal bearing and a set of two vertical bearings;
 a first array of thermocouples for the horizontal bearing, and a second and a third array of thermocouples for the set of two vertical bearings arranged downstream of a lubrication system, wherein thermal trends of each bearing are monitored and tracked; and
 a chain provided along the conveyor, the chain separated into a plurality of chain sections, wherein each of the plurality of chain sections is capable of being removed from the chain.

2. The system of claim 1, wherein the horizontal bearing is arranged toward the center of each of the plurality of pitches, and wherein the set of two vertical bearings are arranged on a trailing side of each of the plurality of pitches.

3. The system of claim 1, wherein each of the plurality of pitches is capable of being removed from the conveyor after a starting pitch is jogged to a maintenance position.

4. The system of claim 1, wherein any of the horizontal bearing and the set of two vertical bearings is capable of being removed from the conveyor.

5. The system of claim 1 further comprising:
 a flag assembly provided on the conveyor, wherein the flag assembly indicates whether any of the horizontal bearing and the set of two vertical bearings requires maintenance or replacement.

6. The system of claim 1 further comprising:
 at least one upstream horizontal thermocouple arranged downstream of at least one upstream vertical thermocouple;
 an oiler arranged downstream of the at least one upstream horizontal thermocouple and the at least one upstream vertical thermocouple; and
 a home sensor arranged downstream of the oiler.

7. The system of claim 6 further comprising:
 a maintenance module arranged downstream of the home sensor;
 at least one downstream horizontal thermocouple arranged downstream of the maintenance module; and
 at least one downstream vertical thermocouple arranged downstream of the at least one downstream horizontal thermocouple.

8. The system of claim 1 further comprising:
a plurality of interactive display screens including a home screen, a trends screen, a sensors screen, an active chain screen, and an alarms screen.

9. The system of claim 8, wherein the plurality of interactive display screens provide real-time data on bearing temperatures, pitch temperatures, and maintenance alarms.

10. A conveyor system, comprising:
a conveyor arranged to move from an upstream position to a downstream position;
a plurality of pitches provided along the conveyor, wherein each of the plurality of pitches contains a horizontal bearing and a set of two vertical bearings;
a feedback mechanism arranged to continuously monitor thermal trends of any of the horizontal bearing and the set of two vertical bearings and compare upstream and downstream data;
a proofer or an oven including a load-on position and a load-off position, wherein the load-on position is the starting point for the conveyor and the load-off position is the ending point; and
a chain provided along the conveyor, the chain separated into a plurality of chain sections, wherein each of the plurality of chain sections is capable of being removed from the chain.

11. The system of claim 10, wherein the horizontal bearing is arranged toward the center of each of the plurality of pitches, and wherein the set of two vertical bearings are arranged on a trailing side of each of the plurality of pitches.

12. The system of claim 10, wherein each of the plurality of pitches is capable of being removed from the conveyor after a starting pitch is jogged to a maintenance position.

13. The system of claim 10, wherein any of the horizontal bearing and the set of two vertical bearings is capable of being removed from the conveyor.

14. The system of claim 10 further comprising:
a plurality of thermocouples positioned along the conveyor and arranged to measure a temperature at various points on the conveyor.

15. The system of claim 14, wherein a temperature change of approximately 0.2 second at any thermocouple results in a flag being displayed to service the system.

16. The system of claim 10 further comprising:
a plurality of interactive display screens including a home screen, a trends screen, a sensors screen, an active chain screen, and an alarms screen.

* * * * *